US009886705B2

United States Patent
Xu et al.

(10) Patent No.: US 9,886,705 B2
(45) Date of Patent: Feb. 6, 2018

(54) ADVERTISEMENT OPPORTUNITY BIDDING

(71) Applicant: Yahoo!, Inc., Sunnyvale, CA (US)

(72) Inventors: Jian Xu, San Jose, CA (US); Chunming Wang, Beijing (CN); Ming Chang, Beijing (CN)

(73) Assignee: EXACLIBUR IP, LLC, Sunnyvale, CA (US)

( * ) Notice: Subject to any disclaimer, the term of this patent is extended or adjusted under 35 U.S.C. 154(b) by 489 days.

(21) Appl. No.: 14/497,546

(22) Filed: Sep. 26, 2014

(65) Prior Publication Data

US 2016/0092933 A1   Mar. 31, 2016

(51) Int. Cl.
*G06Q 30/00* (2012.01)
*G06Q 30/02* (2012.01)

(52) U.S. Cl.
CPC ................ *G06Q 30/0275* (2013.01)

(58) Field of Classification Search
None
See application file for complete search history.

(56) References Cited

U.S. PATENT DOCUMENTS

| | | | | |
|---|---|---|---|---|
| 7,418,405 | B1* | 8/2008 | Utter ...................... | G06Q 30/02 705/26.81 |
| 8,762,193 | B2* | 6/2014 | Maga ............... | G06Q 10/06375 705/7.29 |
| 2003/0033196 | A1* | 2/2003 | Tomlin .................. | G06Q 30/02 705/14.52 |
| 2003/0083932 | A1* | 5/2003 | Wolf ...................... | G06Q 20/10 705/14.66 |
| 2004/0102996 | A1* | 5/2004 | Boppana .............. | G06Q 10/067 705/500 |
| 2007/0130005 | A1* | 6/2007 | Jaschke .................. | G06Q 30/02 705/14.66 |
| 2007/0199017 | A1* | 8/2007 | Cozen .................... | G06Q 30/02 725/35 |
| 2007/0280441 | A1* | 12/2007 | Liu .................. | G06Q 10/06375 379/88.22 |
| 2008/0256034 | A1* | 10/2008 | Chang .................... | G06Q 30/02 |

(Continued)

OTHER PUBLICATIONS

STIC NPL Search Results—14497546-EIC3600 Search Report-Sittner (Author & Assignee Search).*
STIC NPL Search Results—14497546-EIC3600 Search Report-Sittner.*

*Primary Examiner* — Matthew T Sittner
(74) *Attorney, Agent, or Firm* — Cooper Legal Group, LLC

(57) ABSTRACT

A demand-side platform (DSP) may bid on advertising opportunities (e.g., provided by a supply-side platform (SSP)) on behalf of an advertiser wishing to place an advertisement, such as part of an advertisement campaign. A target advertisement may be selected based upon various criteria, and a bid for the target advertisement to run during the advertising opportunity is made in a manner that satisfies one or more goals of the advertisement campaign while also being beneficial to the DSP. For example, the target advertisement may be selected from a reduced problem space where merely advertisements corresponding to a target advertising opportunity class are evaluated, where the target opportunity class corresponds to an opportunity class of the advertising opportunity. Win rate modeling data, inventory cost modeling data, user response modeling data, and/or other information may be used to select the target advertisement.

20 Claims, 7 Drawing Sheets

(56) References Cited

U.S. PATENT DOCUMENTS

| | | | |
|---|---|---|---|
| 2008/0256056 A1* | 10/2008 | Chang | G06Q 30/02 |
| 2008/0281679 A1* | 11/2008 | Shehan | G06Q 30/02 705/7.31 |
| 2009/0055267 A1* | 2/2009 | Roker | G06F 17/3089 705/14.1 |
| 2009/0222346 A1* | 9/2009 | Greene | G06Q 10/04 705/14.53 |
| 2010/0082423 A1* | 4/2010 | Nag | G06Q 30/02 705/14.43 |
| 2010/0114696 A1* | 5/2010 | Yang | G06Q 30/02 705/14.49 |
| 2010/0161424 A1* | 6/2010 | Sylvain | G06Q 30/02 705/14.66 |
| 2010/0228634 A1* | 9/2010 | Ghosh | G06Q 30/02 705/14.71 |
| 2010/0228635 A1* | 9/2010 | Ghosh | G06Q 30/02 705/14.71 |
| 2010/0250327 A1* | 9/2010 | Relyea, Jr. | G06Q 30/02 705/14.53 |
| 2010/0251290 A1* | 9/2010 | Kodialam | H04N 7/17318 725/34 |
| 2010/0257054 A1* | 10/2010 | Martin | G06Q 30/02 705/14.46 |
| 2011/0035276 A1* | 2/2011 | Ghosh | G06Q 30/02 705/14.46 |
| 2011/0040619 A1* | 2/2011 | Jebara | G06Q 30/0241 705/14.46 |
| 2011/0078001 A1* | 3/2011 | Archer | G06Q 30/02 705/14.2 |
| 2011/0078723 A1* | 3/2011 | Stettner | G06Q 30/02 725/32 |
| 2011/0102263 A1* | 5/2011 | Angeletti | H01Q 3/40 342/373 |
| 2011/0191179 A1* | 8/2011 | Linietsky | G06Q 30/0255 705/14.53 |
| 2011/0264530 A1* | 10/2011 | Santangelo | G06Q 30/02 705/14.64 |
| 2011/0313807 A1* | 12/2011 | Envarli | G06Q 10/06312 705/7.22 |
| 2012/0005238 A1* | 1/2012 | Jebara | G06Q 10/04 707/798 |
| 2012/0010942 A1* | 1/2012 | Bax | G06Q 30/02 705/14.41 |
| 2012/0036023 A1* | 2/2012 | Das | G06Q 30/02 705/14.71 |
| 2012/0116875 A1* | 5/2012 | Wang | G06Q 30/02 705/14.53 |
| 2012/0116882 A1* | 5/2012 | Sanghavi | G06Q 30/0257 705/14.55 |
| 2012/0158693 A1* | 6/2012 | Papadimitriou | G06F 17/30864 707/708 |
| 2012/0166292 A1* | 6/2012 | Bax | G06Q 30/0241 705/14.71 |
| 2012/0191528 A1* | 7/2012 | Bax | G06Q 30/02 705/14.41 |
| 2012/0265616 A1* | 10/2012 | Cao | G06Q 30/0261 705/14.58 |
| 2013/0060631 A1* | 3/2013 | Corson | G06Q 30/0241 705/14.46 |
| 2013/0166395 A1* | 6/2013 | Vassilvitskii | G06Q 30/0244 705/14.73 |
| 2013/0173384 A1* | 7/2013 | Vee | G06Q 30/02 705/14.49 |
| 2013/0325624 A1* | 12/2013 | Cardella | G06Q 30/02 705/14.66 |
| 2013/0339153 A1* | 12/2013 | Mishra | G06Q 30/0241 705/14.66 |
| 2013/0343536 A1* | 12/2013 | Dey | G06O 30/0202 379/266.08 |
| 2014/0108159 A1* | 4/2014 | Hughes | G06Q 30/0275 705/14.71 |
| 2014/0129306 A1* | 5/2014 | Rappoport | G06Q 30/0212 705/14.14 |
| 2014/0129320 A1* | 5/2014 | Jebara | G06Q 10/00 705/14.42 |
| 2014/0129336 A1* | 5/2014 | Bailey | G06Q 30/0261 705/14.58 |
| 2015/0134462 A1* | 5/2015 | Jalali | G06Q 30/0275 705/14.71 |
| 2015/0220530 A1* | 8/2015 | Banadaki | G06F 17/30943 707/723 |
| 2016/0092933 A1* | 3/2016 | Xu | G06Q 30/0275 705/14.71 |

* cited by examiner

ADVERTISEMENT OPPORTUNITY BIDDING

BACKGROUND

Many content providers, applications, and/or websites provide advertisement opportunities. In an example, a video streaming content provider may provide video advertisement opportunities. In another example, a website may provide imagery advertisement opportunities. Advertisers may utilize a demand-side platform (DSP) to bid on advertisement opportunities on behalf of the advertisers. For example, the DSP may receive an advertisement call, requesting bids from DSPs for an advertisement opportunity, from a supply-side platform (SSP). The DSP and/or other DSPs may submit bids, on behalf of advertisers, back to the SSP in response to the request, and a winning advertiser may acquire and utilize the advertisement opportunity such as to display an advertisement.

SUMMARY

In accordance with the present disclosure, an advertising call, requesting one or more bids for an advertising opportunity, may be received. A set of advertising opportunity classes may be evaluated to identify a target advertising opportunity class of which the advertising opportunity is indicative. A group of advertisements may be identified, from a plurality of available advertisements, as corresponding to the target advertising opportunity class. A set of assignment probability parameters, associated with the target advertising opportunity class and/or the group of advertisements, may be evaluated to identify a target advertisement within the group of advertisements. A bid, at a bid value associated with the target advertising opportunity class and/or the group of advertisements, for the advertising opportunity may be submitted on behalf of the target advertisement.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
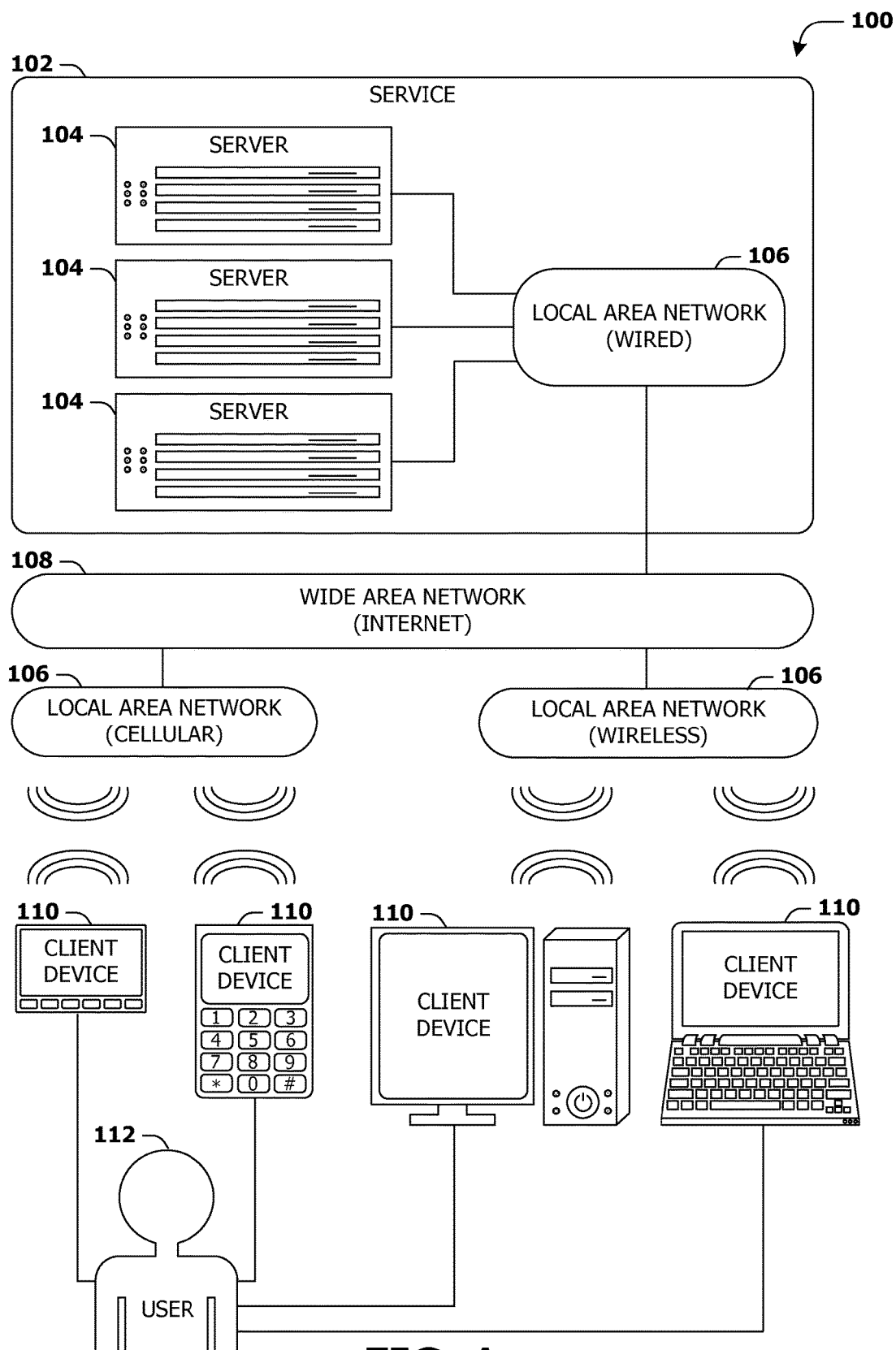
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fibre Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi network or a Bluetooth personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
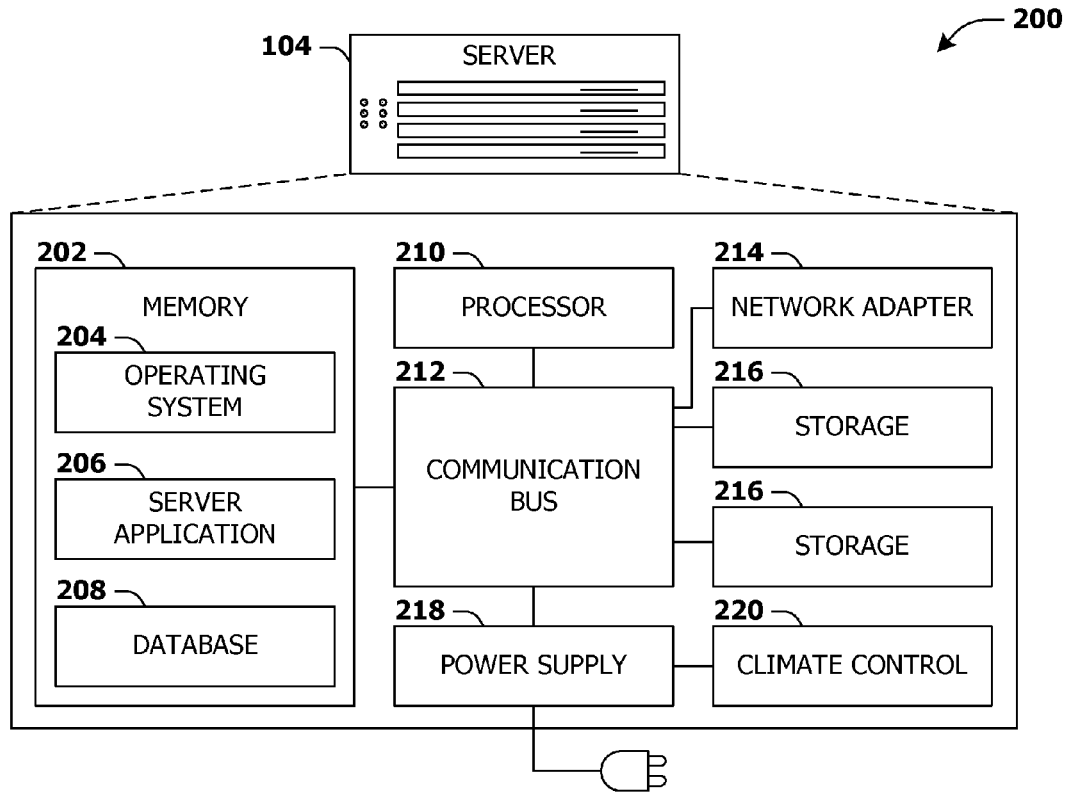
FIG. 2 is an illustration of a scenario involving an exemplary configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
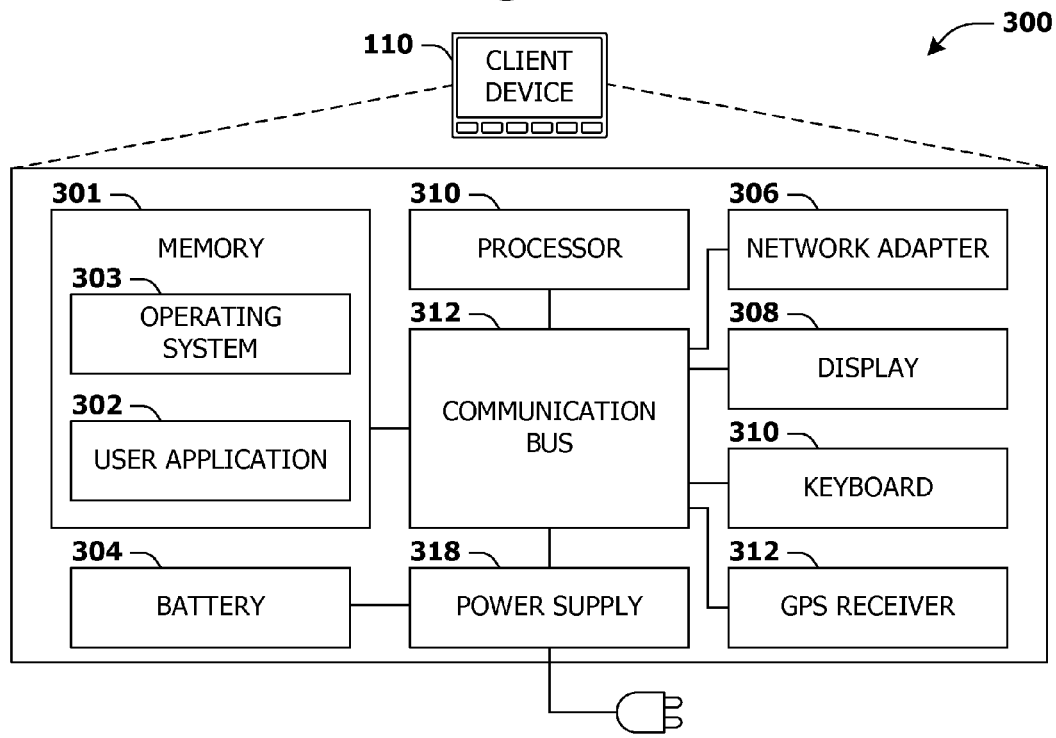
FIG. 3 is an illustration of a scenario involving an exemplary configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 210 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 310, a mouse, a microphone, a camera, and/or a touch-sensitive component of the display 308; and/or environmental sensors, such as a global positioning system (GPS) receiver 312 that detects the location, velocity, and/or acceleration of the client device 110, a compass, accelerometer, and/or gyroscope that detects a physical orientation of the client device 110. Other components that may optionally be included with the client device 110 (though not shown in the schematic diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

A demand-side platform (DSP) may be configured to bid on advertising opportunities on behalf of an advertiser, such as for an advertisement campaign of the advertiser. A DSP may be configured to manage, on behalf of a plural number of advertisers, a plural number of heterogeneous campaigns. These campaigns may be heterogeneous in that the campaigns may have different setups such as different budget amounts, different targeting audiences, different billing methods, different campaign goals (e.g. a CPC goal, a CPA goal, etc.). Meanwhile, an advertisement campaign may be heterogeneous in that the advertisement campaign may have varying advertisement campaign contexts. Given an advertising context, an advertiser may desire to have a first ad run for an advertising opportunity instead of a second ad. For example, an advertiser may desire to have a first portion of an advertisement campaign run during a first time period on a first publisher or content provider in order to target a first audience using a first budget (e.g., a car manufacturer may want to run a first advertisement for a mid-priced car during a first sporting event that has a demographic audience with a first median income) and may desire to have a second portion of the advertisement campaign run during a second time period on a second publisher or content provider in order to target a second audience using a second budget (e.g., the car manufacturer may want to run a second advertisement for a high-priced car during a second sporting event that has a demographic audience with a second median income, where the second median income is greater than the first median income). Accordingly, as provided herein, advertisement campaign contexts and/or other information may be taken into account when identifying a target advertisement to bid on an advertisement opportunity.

One or more techniques and/or systems for defining one or more advertising opportunity classes and/or for advertising opportunity bidding are provided herein. For example, a class definition component may be configured to evaluate an advertising call log (e.g., descriptive information about advertising opportunities) and/or a set of campaign metadata (e.g., specifying targeting criteria such as a specified user demographic and/or other descriptive information about how an advertising opportunity may satisfy goals of advertising campaigns) to generate a set of advertising opportunity classes that may be used for advertising opportunity bidding. Similar advertising opportunities may be assigned to an advertising opportunity class (e.g., advertising opportunities with similar user demographics, position and layout, publisher page contents, etc.). When an advertising call, requesting one or more bids for an advertising opportunity, is received, a target advertising opportunity class, of which the advertising opportunity is indicative, may be identified. A group of advertisements, whose targeting criteria are satisfied by the target advertising opportunity class, may be evaluated to identify a target advertisement. A bid for the advertising opportunity may be submitted on behalf of the target advertisement. Evaluating merely the group of advertisements that correspond to the target advertising opportunity class may substantially reduce a number of advertisements that may be evaluated for selection of the target advertisement, thus conserving resources (e.g., computational time, bandwidth requirements, etc.). Selecting the target advertisement in this manner may also increase profit associated with bidding on the advertising opportunity (e.g., selecting an advertisement with a relatively smaller bid value parameter and/or a relatively larger assignment probability parameter) while achieving advertisement campaign goals (e.g., advertising the target advertisement during particular times of the day even though the target advertisement might not be the highest bidder or profit maker for a DSP at the current moment).

Figure 4:
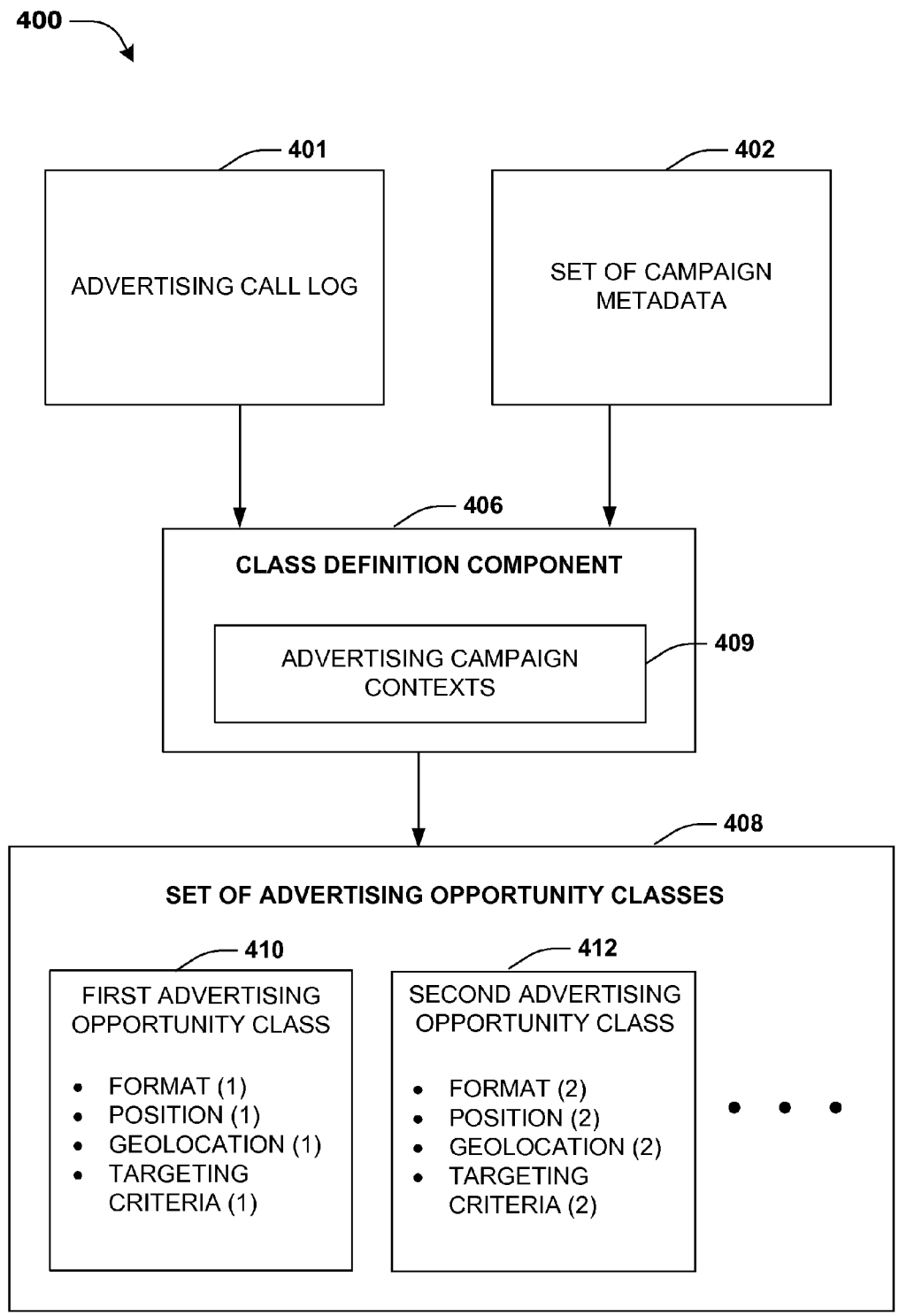
FIG. 4 is a component block diagram illustrating an exemplary system for defining one or more advertising opportunity classes.

FIG. 4 illustrates an example of a system 400 for defining one or more advertising opportunity classes. The system 400 comprises a class definition component 406. In an example, the class definition component 406 may be configured to generate a set of advertising opportunity classes 408 based upon advertising call information within an advertising call log 401 (e.g., historical information regarding advertising opportunities offered through advertising calls, such as content source information (e.g., identification of a social network website content source; identification of a video streaming content source; identification of a radio streaming content source; etc.), user demographic information for users that consume content from the content source, user behavior information such as whether users engage in advertisements from the content source, winning bid costs, inventory costs, etc.). In another example, the class definition component 406 may be configured to generate the set of advertising opportunity classes 408 based upon campaign metadata within a set of campaign metadata 402 (e.g., advertising campaign formats and/or advertising campaign targeting criteria, such as age, gender, location, or other attributes of users to which an advertisement may be relevant or targeted toward).

An advertising opportunity class may comprise a group of advertisement opportunities that may share similar properties, such as publisher (e.g., a particular content source through which advertisements are to be shown), position (e.g., solicit user purchases, solicit newsletter signup, etc.), format, targeting criteria (e.g., 21 year old males in college athletics), user profile (e.g., a user demographic reached by a content source), and/or other advertising campaign context 409 that may be indicative of advertisement opportunity value to advertisers. In this way, the set of advertising opportunity classes 408 may partition advertising opportunities into disjointed subsets, such as a first advertising opportunity class 410 having a first advertising campaign context (e.g., advertisement opportunities that may be valuable to advertisement campaigns that pay per click and are targeted towards women in their 30s) and a second advertising opportunity class 412 having second advertising campaign context (e.g., advertisement opportunities that may be valuable to advertisement campaigns that pay per action and are targeted towards teenagers). In an example, an initial partition of advertisement opportunities is performed based upon advertising campaign targeting criteria (e.g., types of users that are targeted by advertisements) to create an initial partition of advertising opportunities. A subsequent refinement of the initial partition of advertising opportunities is performed to create equivalence classes that may be used to generate advertising opportunity classes. Because advertising opportunity bidding may be confined to a problem space associated merely with a single advertisement opportunity class, parameters that are to be estimated for identifying a target advertisement to bid on an advertisement opportunity may be significantly reduced (e.g., from a billion parameters to thousands of parameters).

Figure 5:
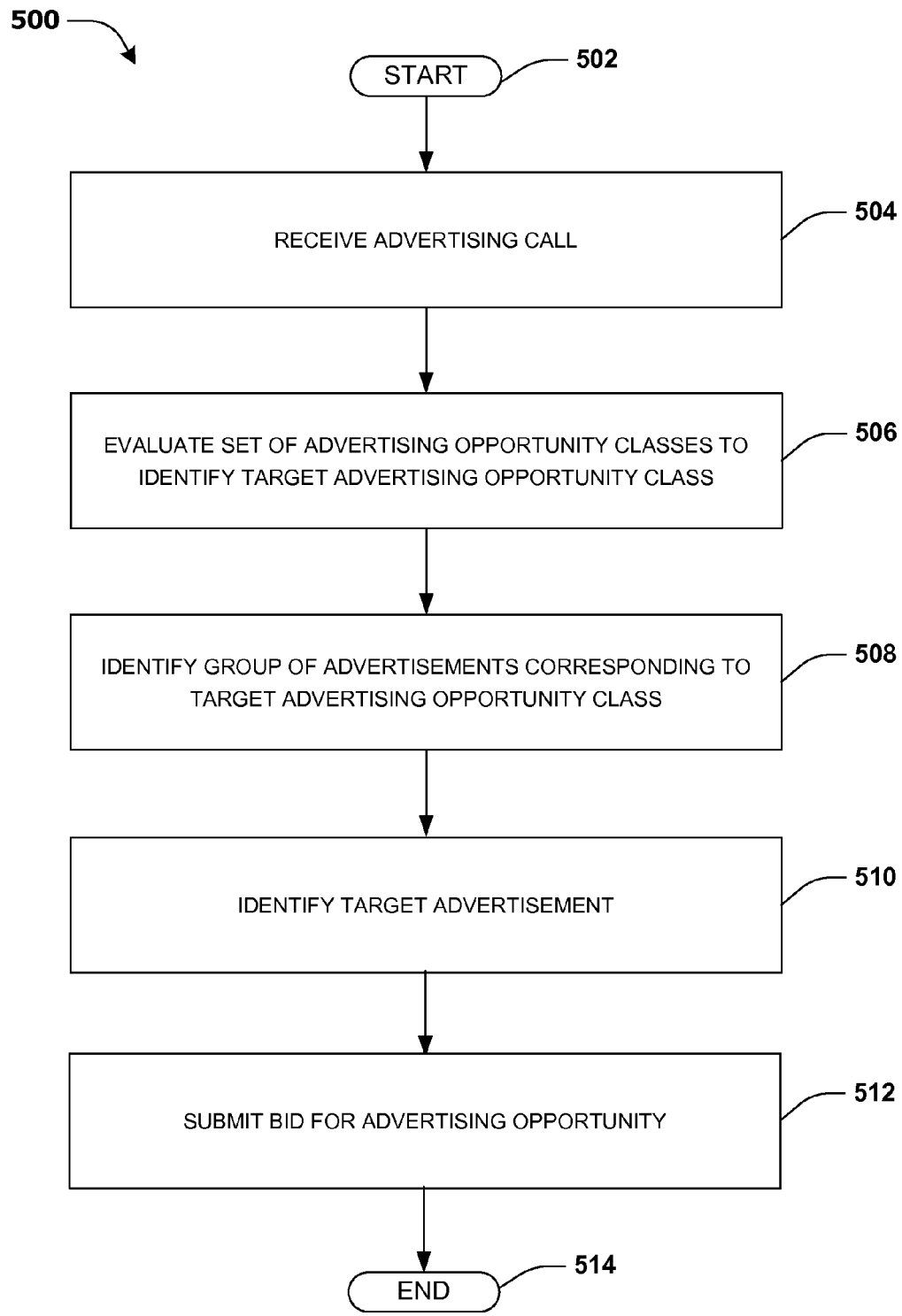
FIG. 5 is a flow chart illustrating an exemplary method of advertising opportunity bidding.

An embodiment of advertising opportunity bidding is illustrated by an exemplary method 500 of FIG. 5. At 502, the method starts. At 504, an advertising call may be received. The advertising call may request one or more bids for an advertising opportunity (e.g., an opportunity to display a video advertisement, through a college social network, to a female college student that has a relatively high probability of interacting with videos). For example, a supply-side platform (SSP) may send the advertising call to one or more demand-side platforms (DSP) that may be configured to bid on advertisement opportunities on behalf of advertisers. In an example, a DSP may be configured to implement advertising opportunity bidding, as provided herein, in order to identify a target advertisement to bid on the advertising opportunity.

At 506, a set of advertising opportunity classes may be evaluated to identify a target advertising opportunity class of which the advertising opportunity is indicative. In an example, a set of advertising opportunity classes 408 generated by a class definition component 406, as illustrated in FIG. 4, may be evaluated. For example, the target advertising opportunity class may have been generated and/or defined based upon an advertising campaign context corresponding to a campaign targeting criteria of female college students and/or advertising call log data indicative of video advertising opportunities provided by college social networks. In this way, the target advertising opportunity class may be identified based upon the advertising opportunity.

Figure 6A:
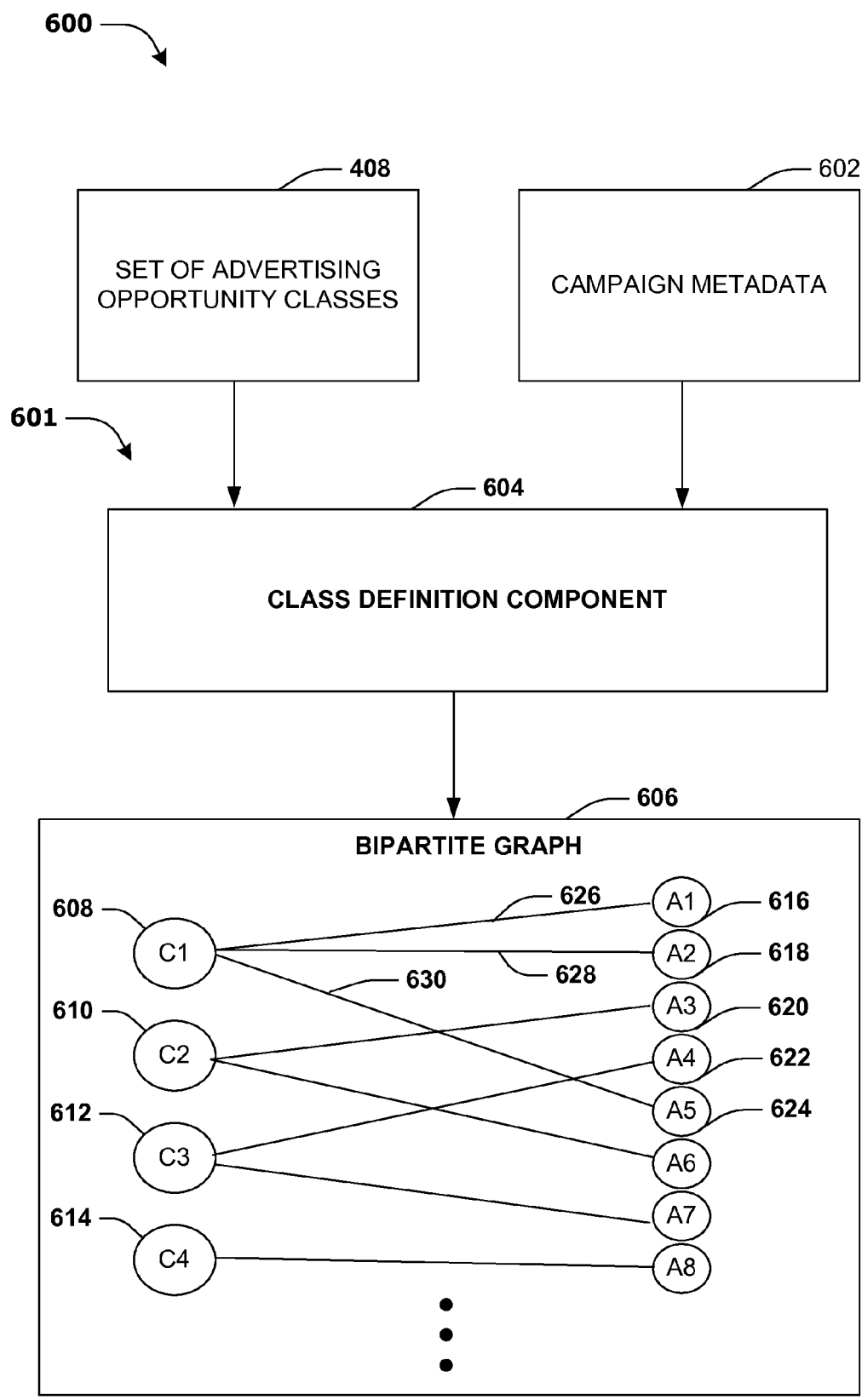
FIG. 6A is a component block diagram illustrating an exemplary system for generating a bipartite graph.

At 508, a group of advertisements may be identified, from a plurality of available advertisements, as corresponding to the target advertising opportunity class. In an example, a bipartite graph may be generated for utilization in identifying the group of advertisements (e.g., as illustrated in FIG. 6A). For example, the bipartite graph may comprise a set of class nodes representing a plurality of advertising opportunity classes (e.g., the set of advertising opportunity classes 408). The bipartite graph may comprise a set of advertisement nodes representing the plurality of available advertisements. The bipartite graph may comprise one or more edges connecting one or more class nodes to one or more advertisement nodes (e.g., a first edge, connecting a first class node, representing a first advertisement opportunity class, to a first advertisement node, representing a first advertisement, may indicate that the first advertisement is eligible to bid on advertisement opportunities of the first advertisement opportunity class). An advertising opportunity context, associated with the advertising opportunity, may be identified (e.g., the advertising opportunity context may describe the advertising opportunity as a video advertisement opportunity associated with a college social network, and that a female college student is currently accessing the college social network). The bipartite graph may be evaluated to identify a target class node, representing the target advertising opportunity class, based upon the advertising opportunity context (e.g., the target advertising opportunity class and the advertising opportunity may be tailored towards female college students that may interact with video advertisements). An advertisement represented by an advertising node, within the set of advertising nodes, may be identified for inclusion within the group of advertisements based upon the target class node being connected to the advertisement node by at least one edge.

At 510, a set of assignment probability parameters (e.g., a benefit or motivation to bid on the advertisement opportunity on behalf of an advertisement, such as to increase profit of the DSP and/or to satisfy an advertisement campaign goal associated with the advertisement), and/or bid value parameters (e.g., an amount to bid on the advertisement opportunity on behalf of an advertisement) of associated with the target advertising opportunity class and/or the group of advertisements, may be evaluated to identify a target advertisement within the group of advertisements. In an example, edges within the bipartite graph may specify the assignment probability parameters and/or the bid value parameters. For example, the first edge may specify an assignment probability parameter indicative of the benefit or motivation of submitting a bid, on behalf of the first advertisement, for advertisement opportunities of the first advertisement opportunity class. In an example, the assignment probability parameter may be based upon a win rate model (e.g., derived from advertising call log data and/or bid log data) specifying a predictive analysis as to whether a bid value for the first advertisement will win advertising opportunities associated with the first advertising opportunity class. In another example, the assignment probability parameter may be based upon an inventory cost model (e.g., derived from bid log data and/or impression log data) specifying an estimate cost for the first advertisement to win advertising opportunities associated with the first advertising opportunity class. In another example, the assignment probability parameter may be based upon a response model (e.g., derived from response log data and/or impression log data corresponding to user interaction with advertisements) specifying a predicted user response to advertising opportunities associated with the first advertising opportunity class. In another example, the assignment probability parameter may be based upon at least one of a user demographic, a user geo location, a user age, contextual user information, user search history, or content through which an advertising opportunity is to be presented (e.g., user demographics, user traffic volume, and/or other information about the college social network or other college social networks). In another example, the assignment probability parameter may be based upon an evaluation algorithm (e.g., an optimization algorithm) that determines a value, of the set of assignment probability parameters of the group of advertisements, that increases (e.g., optimizes) an objective, such as a profit increase objective, an advertisement delivery objective, a click through rate objective, or an advertising campaign objective.

In an example of evaluating the set of assignment probability parameters, the set of assignment probability parameters may be collected. The target advertisement may be identified based on the target advertisement being associated with an assignment probability parameter set threshold of the set of assignment probability parameters (e.g., a relatively larger assignment probability parameter indicative of a relatively larger probability for selection). For example, a first evaluation metric for a first advertisement may be determined based upon a first assignment probability parameter associated with the first available advertisement. The first evaluation metric may be indicative of a benefit associated with bidding on the advertisement opportunity on behalf of the first available advertisement (e.g., an expected profit for the DSP and/or an ability to satisfy campaign goals of the first available advertisement). A second evaluation metric for a second advertisement may be determined based upon a second assignment probability parameter associated with the second available advertisement. The second evaluation metric may be indicative of a benefit associated with bidding on the advertisement opportunity on behalf of the second available advertisement (e.g., an expected profit for the DSP and/or an ability to satisfy campaign goals of the second available advertisement).

The first advertisement, but not the second advertisement, may be identified as the target advertisement based upon the first evaluation metric being greater than the second evaluation metric. In this way, the benefit of submitting a bid for the advertisement opportunity may be increased by submitting the bid on behalf of the target advertising as opposed to other advertisements (e.g., to increase profit for the DSP). For example, a first advertiser may specify that the first advertisement is to be shown merely from 9 am to 1 pm. The first advertisement may have a relatively lower bidding price and/or expected profit for the DSP than the second advertisement. Without taking into consideration the advertising campaign information regarding the 9 am to 1 pm criteria, the second advertisement would usually be selected over the first advertisement to bid on advertisement opportunities until the budget of the second advertisement runs out (e.g., budget may be refreshed every morning at 9 am). If the budget of the second advertisement runs out after 1 pm, then both the second advertisement and the first advertisement will not be available to bid on advertising opportunities until 9 am (e.g., when the second advertisement regains budget and when the 9 am to 1 pm criteria of the first advertisement is satisfied). Thus, bidding merely based upon bidding price and expected profit may not result in an efficient overall bidding scheme (e.g., the inability to bid from 1 pm until 9 am may result in decreased profits for the DSP and/or failure to satisfy campaign goals). As provided herein, assignment probability parameters (e.g., derived from advertising campaign metadata such as advertising goals) may take into account the 9 am to 1 pm criteria so that the first advertisement and the second advertisement are efficiently selected for bidding (e.g., the first advertisement may be selected for morning bidding notwithstanding the second advertisement paying more for bids, and then second advertisement may be selected for bidding after 1 pm).

At 512, a bid, at a bid value associated with the target advertising opportunity class and the target advertisement, is submitted, on behalf of the target advertisement, for the advertising opportunity. For example, the DSP may submit the bid to the SSP. If the bid wins, then the target advertisement may be provided through the college social network. At 514, the method ends.

Figure 6B:
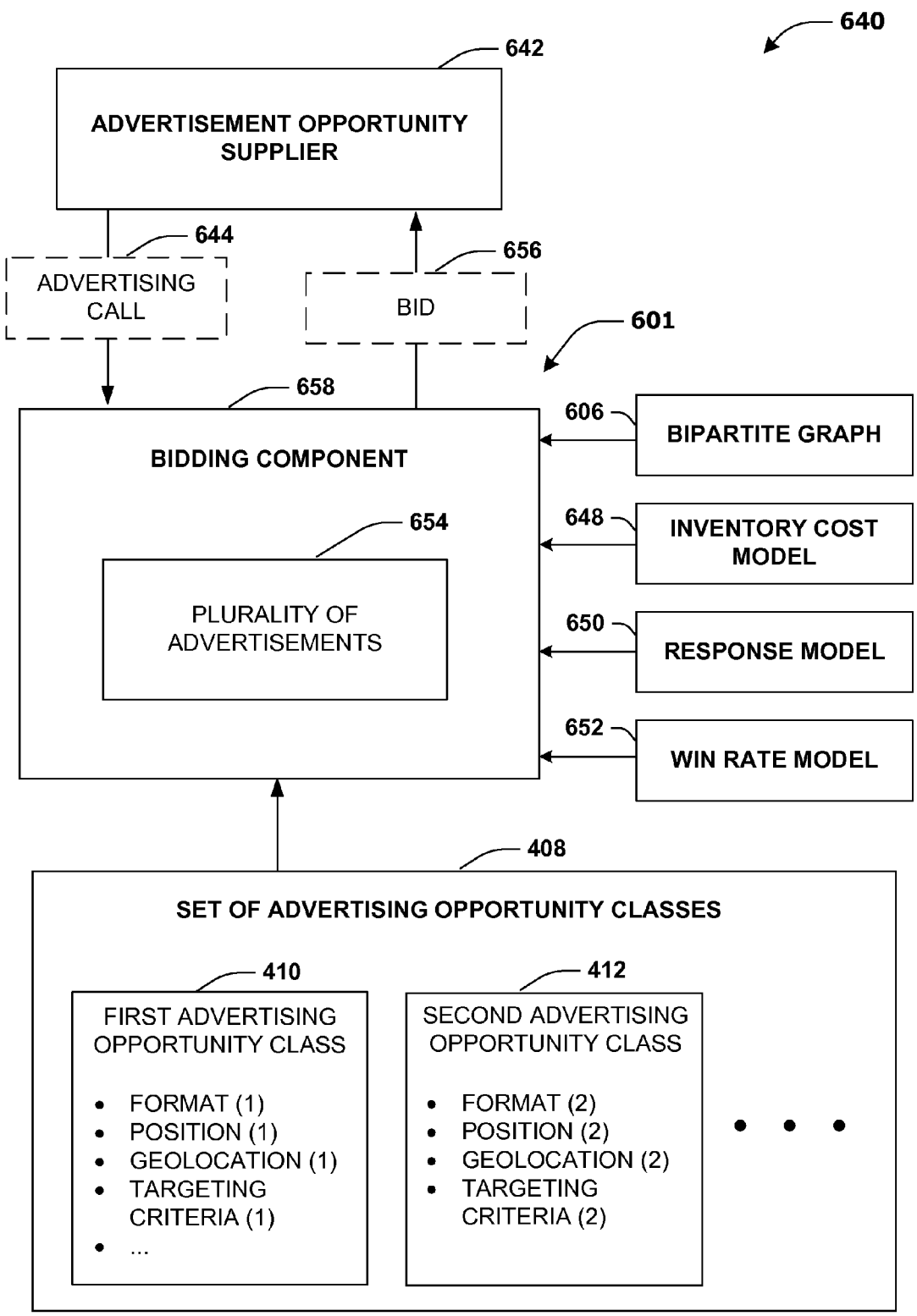
FIG. 6B is a component block diagram illustrating an exemplary system for advertising opportunity bidding.

FIGS. 6A-6B illustrate examples of a system 601, comprising a class definition component 604 and/or a bidding component 658, for generating a bipartite graph 606 and/or for advertising opportunity bidding. FIG. 6A illustrates an example 600 of generating the bipartite graph 606. The class definition component 604 may be configured to evaluate a set of advertising opportunity classes 408 (e.g., generated in FIG. 4) and/or campaign metadata 602 to populate the bipartite graph 606 with a set of class nodes representing advertising opportunity classes (e.g., a first class node 608 representing a first advertising opportunity class 410, a second class node 610 representing a second advertising opportunity class 412, a third class node 612 representing a third advertising opportunity class, a fourth class node 614 representing a fourth advertising opportunity class, and/or other class nodes). The class definition component 604 may populate the bipartite graph 606 with a set of advertisement nodes representing available advertisements (e.g., a first advertisement node 616 representing a first advertisement, a second advertisement node 618 representing a second advertisement, a third advertisement node 620 representing a third advertisement, a fourth advertisement node 622 representing a fourth advertisement, a fifth advertisement node 624 representing a fifth advertisement, and/or other advertisement nodes).

The class definition component 604 may connect one or more class nodes to one or more advertisement nodes based upon the set of advertising opportunity classes 408 and/or campaign metadata 602 (e.g., the first class node 608 may be connected to the first advertisement node 616 by a first edge 626, to the second advertisement node 618 by a second edge 628, and to the fifth advertisement node 624 by a third edge 630). For example, an edge between an advertisement node and a class node may indicate a relationship/relevancy and/or ability of an advertisement, represented by the advertisement node, to bid on advertising opportunities associated with an advertising opportunity class represented by the class node. For example, the edge may specify an assignment probability parameter (e.g., 0.3 corresponding to a 30% probability that the advertisement should bid on an advertising opportunity associated with the advertising opportunity class) based upon the campaign metadata 602, such as an advertising campaign goal of the advertisement (e.g., spread a message, sell a product, have users sign up for newsletters, etc.), an advertising campaign budget of the advertisement (e.g., a daily budget, a lifetime budget, etc.), advertising campaign format of the advertisement (e.g., audio, video, etc.), advertising campaign targeting criteria of the advertisement (e.g., a user demographic with which the advertisement is directed), advertising campaign billing model of the advertisement (e.g., pay per thousand impressions, pay per click, pay per action, markup, etc.), and/or other metadata (e.g., show advertisement merely during the hours from 9 am till 1 pm; show the advertisement merely to people in cold weather climates; show the advertisement merely when there is rain; show the advertisement to merely mobile devices; etc.). In this way, the assignment probability parameter may correspond to the benefit and/or motivation for the advertisement to bid on an advertisement opportunity (e.g., profit for the DSP and/or satisfaction of campaign goals). The edge may specify a bid value parameter associated with a bid price that the advertisement would bid on the advertising opportunity. In this way, the bipartite graph 606 may be generated.

An optimization algorithm may be configured to calculate the value of the assignment probability parameters and bid values in order to optimize some metrics. For example, these parameters can be derived if the optimization goal is maximizing profit for the DSP. Such optimization algorithm is configured to optimize objective under a set of constraints. Examples of these constraints are the budget limit of the advertisements, the performance goals of the advertisements (i.e. CPC, CPA goals), etc.

FIG. 6B illustrates an example 640 of submitting a bid 656 on behalf of a target advertisement. The bidding component 658 may receive an advertising call 644 from an advertisement opportunity supplier 642. The advertising call 644 may request one or more bids for an advertising opportunity. The bidding component 658 may evaluate a set of advertising opportunity classes 408 (e.g., generated in FIG. 4) to identify a target advertising opportunity class of which the advertising opportunity is indicative. For example, a first advertising opportunity class 410 may be identified as the target advertising opportunity class based upon the advertising opportunity (e.g., an audio advertising opportunity for a college athletic website) corresponding to a first advertising campaign context of the first advertising opportunity class 410 (e.g., the first advertising opportunity class 410 may be associated with audio advertising opportunities directed towards college athletes).

The bidding component 658 may identify a group of advertisements, from a plurality of advertisements 654, which correspond to the target advertising opportunity class. For example, the bidding component 658 may evaluate the bipartite graph 606 (e.g., illustrated in FIG. 6A) to identify a first advertisement represented by a first advertisement node 616, a second advertisement represented by a second advertisement node 618 and a fifth advertisement represented by a fifth advertisement node 624 as corresponding to the first advertising opportunity class 410, represented by a first class node 608, based upon a first edge 626, a second edge 628, and a third edge 630 connecting such advertisement nodes to the first class node 608.

The bidding component 658 may evaluate a set of assignment probability parameters, associated with the target advertising opportunity class and/or bid value parameters of advertisements within the group of advertisements, to identify a target advertisement. For example, an assignment probability parameter, associated with an advertisement, may be determined based upon an inventory cost model 648 (e.g., a cost to purchase an advertising opportunity associated with the first advertising opportunity class 410 with a particular bid), a response model 650 (e.g., whether users perform actions after viewing advertisements associated with the first advertising opportunity class 410, whether users click on advertisements associated with the first advertising opportunity class 410, etc.), a win rate model 652 (e.g., a percentage chance that a bid for an advertisement opportunity associated with the first advertising opportunity class 410 will be won or lost at a particular bid price), and/or other information (e.g., a user demographic, a user geolocation, a user age, contextual user information, user search history, information about the college athlete website, etc.). In this way, the target advertisement may be identified, and the bid 656 may be generated based upon a profit increase function (e.g., selection of an advertisement with a relatively larger assignment probability parameter (e.g., associated with a benefit, such as a profit for the DSP and/or satisfaction of campaign goals) and/or a relatively smaller bid value parameter) associated with a DSP system (e.g., comprising the bidding component 658) that manages heterogeneous advertising campaigns. The bid 656, at a bid value associated with the target advertising opportunity class and/or the target advertisement, may be submitted to the advertisement opportunity supplier 642 for evaluation as to whether the target advertisement wins the advertisement opportunity.

Figure 7:
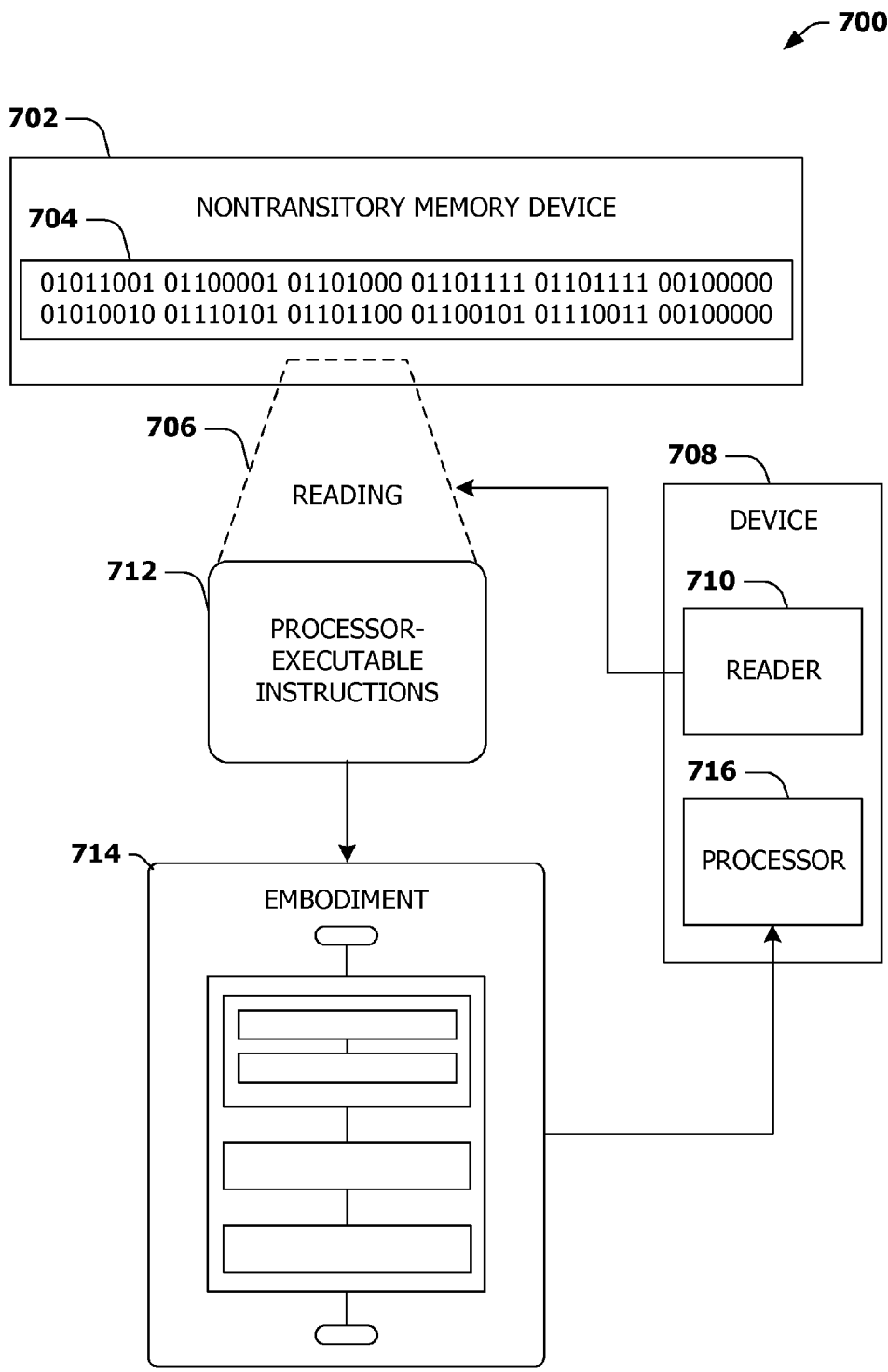
FIG. 7 is an illustration of a scenario featuring an exemplary nontransitory memory device in accordance with one or more of the provisions set forth herein.

FIG. 7 is an illustration of a scenario 700 involving an exemplary nontransitory memory device 702. The nontransitory memory device 702 may comprise instructions that when executed perform at least some of the provisions herein. The nontransitory memory device may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD, DVD, or floppy disk). The exemplary nontransitory memory device 702 stores computer-readable data 704 that, when subjected to reading 706 by a reader 710 of a device 708 (e.g., a read head of a hard disk drive, or a read operation invoked on a solid-state storage device), express processor-executable instructions 712. In some embodiments, the processor-executable instructions, when executed on a processor 716 of the device 708, are configured to perform a method, such as at least some of the exemplary method 500 of FIG. 5, for example. In some embodiments, the processor-executable instructions, when executed on the processor 716 of the device 708, are configured to implement a system, such as at least some of the exemplary system 400 of FIG. 4 and/or at least some of the exemplary system 601 of FIGS. 6A and 6B, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "exemplary" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

The invention claimed is:

1. A method for advertising opportunity bidding, comprising:
    receiving an advertising call, the advertising call requesting one or more bids for an advertising opportunity;
    evaluating a set of advertising opportunity classes to identify a target advertising opportunity class of which the advertising opportunity is indicative;
    identifying, via a processor, a group of advertisements, from a plurality of available advertisements, as corresponding to the target advertising opportunity class, the identifying a group of advertisements comprising:
        identifying, via the processor, an advertising opportunity context associated with the advertising opportunity;
        evaluating, via the processor, a bipartite graph to identify a target class node, representing the target advertising opportunity class, based upon the advertising opportunity context, the bipartite graph comprising a set of class nodes representing a plurality of advertising opportunity classes that each correspond to a group of advertisement opportunities sharing one or more common properties, the bipartite graph comprising a set of advertisement nodes representing the plurality of available advertisements, the bipartite graph comprising one or more edges connecting one or more class nodes to one or more advertisement nodes; and
        identifying, via the processor, an advertisement node, within the set of advertisement nodes, for inclusion within the group of advertisements based upon the target class node being connected to the advertisement node by at least one edge;
    evaluating a set of assignment probability parameters, associated with the target advertising opportunity class and the group of advertisements, to determine a target advertisement within the group of advertisements; and
    submitting a bid, at a bid value associated with the target advertising opportunity class and the target advertisement, on behalf of the target advertisement for the advertising opportunity.

2. The method of claim 1, the one or more common properties comprising at least two of a common publisher, a common position, a common format, a common criteria or a common user profile.

3. The method of claim 1, the one or more common properties comprising a common publisher.

4. The method of claim 1, the one or more common properties comprising a common position.

5. The method of claim 1, the one or more common properties comprising a common format.

6. The method of claim 1, the one or more common properties comprising a common criteria.

7. The method of claim 1, the one or more common properties comprising a common user profile.

8. A system for advertising opportunity bidding, comprising:
    a processor; and
    memory comprising processor-executable instructions that when executed by the processor cause the processor to implement a bidding component configured to:
        receive an advertising call, the advertising call requesting one or more bids for an advertising opportunity;
        evaluate a set of advertising opportunity classes to identify a target advertising opportunity class of which the advertising opportunity is indicative;

identify a group of advertisements, from a plurality of available advertisements, as corresponding to the target advertising opportunity class, the identifying a group of advertisements comprising:

identifying an advertising opportunity context associated with the advertising opportunity;

evaluating a bipartite graph to identify a target class node, representing the target advertising opportunity class, based upon the advertising opportunity context, the bipartite graph comprising a set of class nodes representing a plurality of advertising opportunity classes that each correspond to a group of advertisement opportunities sharing one or more common properties, the bipartite graph comprising a set of advertisement nodes representing the plurality of available advertisements, the bipartite graph comprising one or more edges connecting one or more class nodes to one or more advertisement nodes; and identifying an advertisement node, within the set of advertisement nodes, for inclusion within the group of advertisements based upon the target class node being connected to the advertisement node by at least one edge;

evaluate a set of assignment probability parameters, associated with the target advertising opportunity class and the group of advertisements, to determine a target advertisement within the group of advertisements; and submit a bid, with the bid value associated with the target advertising opportunity class and the target advertisement, on behalf of the target advertisement for the advertising opportunity.

9. The system of claim 8, the one or more common properties comprising a common publisher.

10. The system of claim 8, the one or more common properties comprising a common position.

11. The system of claim 8, the one or more common properties comprising a common format.

12. The system of claim 8, the one or more common properties comprising a common criteria.

13. The system of claim 8, the one or more common properties comprising a common user profile.

14. The system of claim 8, the one or more common properties comprising at least two of a common publisher, a common position, a common format, a common criteria or a common user profile.

15. A non-transitory machine readable medium having stored thereon processor-executable instructions that when executed cause performance of operations, the operations comprising:

receiving an advertising call, the advertising call requesting one or more bids for an advertising opportunity;

evaluating a set of advertising opportunity classes to identify a target advertising opportunity class of which the advertising opportunity is indicative;

identifying a group of advertisements, from a plurality of available advertisements, as corresponding to the target advertising opportunity class, the identifying a group of advertisements comprising:

identifying an advertising opportunity context associated with the advertising opportunity;

evaluating a bipartite graph to identify a target class node, representing the target advertising opportunity class, based upon the advertising opportunity context, the bipartite graph comprising a set of class nodes representing a plurality of advertising opportunity classes that each correspond to a group of advertisement opportunities sharing one or more common properties, the bipartite graph comprising a set of advertisement nodes representing the plurality of available advertisements, the bipartite graph comprising one or more edges connecting one or more class nodes to one or more advertisement nodes; and identifying an advertisement node, within the set of advertisement nodes, for inclusion within the group of advertisements based upon the target class node being connected to the advertisement node by at least one edge;

evaluating a set of assignment probability parameters, associated with the target advertising opportunity class and the group of advertisements, to determine a target advertisement within the group of advertisements; and submitting a bid, at a bid value associated with the target advertising opportunity class and the target advertisement, on behalf of the target advertisement for the advertising opportunity.

16. The non-transitory machine readable medium of claim 15, the one or more common properties comprising a common publisher.

17. The non-transitory machine readable medium of claim 15, the one or more common properties comprising a common position.

18. The non-transitory machine readable medium of claim 15, the one or more common properties comprising a common format.

19. The non-transitory machine readable medium of claim 15, the one or more common properties comprising a common criteria.

20. The non-transitory machine readable medium of claim 15, the one or more common properties comprising a common user profile.

* * * * *